R. B. DAY.
METHOD AND APPARATUS FOR REMOVING TIRES FROM CORES.
APPLICATION FILED AUG. 22, 1918.

1,332,812. Patented Mar. 2, 1920.

Inventor
RALPH B. DAY

UNITED STATES PATENT OFFICE.

RALPH B. DAY, OF AKRON, OHIO, ASSIGNOR TO THE GOODYEAR TIRE & RUBBER COMPANY, OF AKRON, OHIO, A CORPORATION OF OHIO.

METHOD AND APPARATUS FOR REMOVING TIRES FROM CORES.

1,332,812.　　　　　Specification of Letters Patent.　　Patented Mar. 2, 1920.

Application filed August 22, 1918. Serial No. 250,955.

*To all whom it may concern:*

Be it known that I, RALPH B. DAY, a citizen of the United States, and resident of Akron, county of Summit, and State of Ohio, have invented new and useful Improvements in Methods and Apparatus for Removing Tires from Cores, of which the following is a specification.

My present invention concerns the loosening of tire carcasses from their forming cores, both before and after vulcanization of the tire carcasses on the forming cores.

The principal object of the present invention is to provide a method and means for loosening a tire carcass from the forming core so that the tire carcass can be easily removed therefrom.

The above and additional objects of a similar nature which will be hereinafter more specifically treated, may be accomplished by such means as are illustrated in the accompanying drawing, described in the following specification and then more particularly pointed out in the claims which are appended hereto and form a part of this application.

Figure 1:
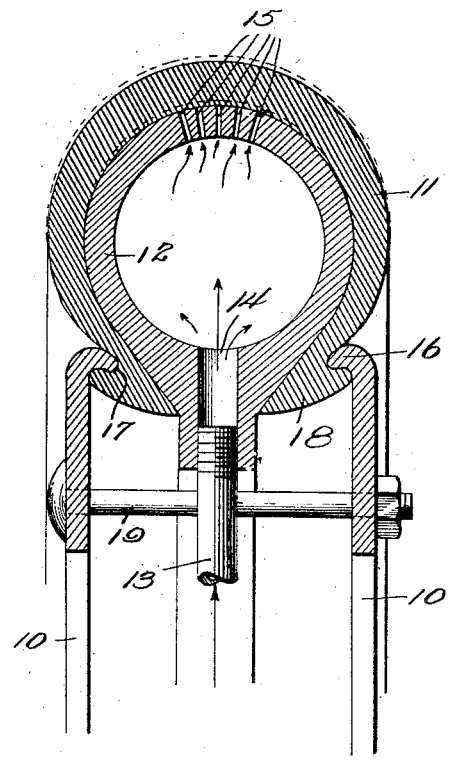
Figure 2:
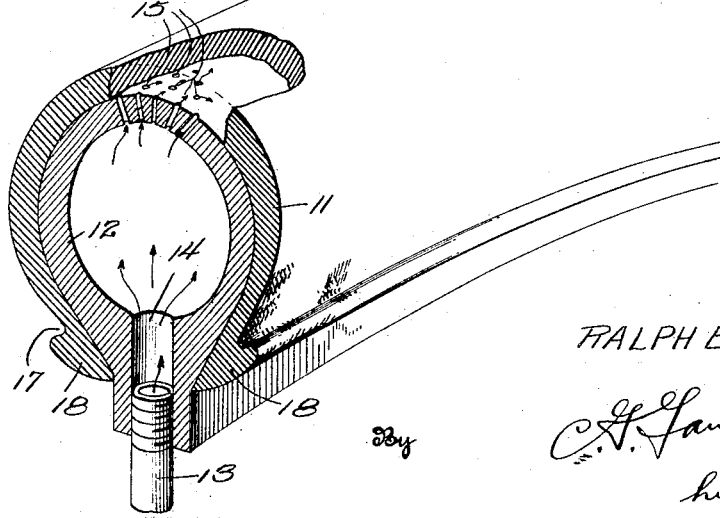

With reference to the drawings, wherein there has been illustrated a preferred embodiment of the means of carrying out the invention as it is reduced to practice, and throughout the several views of which similar reference numbers designate corresponding parts:

Figure 1 is a cross sectional view illustrating the means for loosening the tire carcass on its forming core; and Fig. 2 is a fragmentary perspective view showing the tire carcass on its forming core.

In order to effect the loosening of a tire carcass from its forming core, I contemplate the passing through the core to the under side of the tire carcass, of a suitable fluid medium under pressure which will act to break the adhesion between the tire carcass and the core so that the tire carcass can easily be stripped off of the core. Although the tire carcass can be loosened from the forming core by the compressed fluid medium being passed simultaneously through openings arranged entirely around the core, I prefer to seal the base portion of the tire carcass on the core and pass the compressed fluid medium through a small opening or a cluster of openings, to form between the tire carcass and the core a blister which quickly extends entirely around the core and breaks the adhesion between the tire carcass and the core.

As shown in the drawings, the means preferably employed by me in carrying out the invention comprises a pair of inter-connected rings 10 used for clamping the base portion of the vulcanized tire carcass 11 on its hollow forming core 12; a duct 13 connected to an inlet opening 14, which is provided in the forming core 12; and a cluster of outlet openings 15 which are provided in the outer portion of the forming core and through which passes to the inner side of the tire carcass 11, a suitable fluid under pressure, after such fluid has been passed into the forming core 11 through the supply duct 13 and the opening 14.

The outer edges of the clamping rings 10 are provided with annular lugs 16 adapted to fit in the annular grooves 17 adjacent the beads 18 of the tire carcass 11; the rings being held in operative position by a plurality of bolts 19.

From the foregoing, it will be seen that by adjusting the nuts on the bolts 19, the clamping rings 10 can be adjusted to securely clamp to the forming core 12 the base portion of the tire carcass 11; at which time fluid under pressure may be passed to the under side of the tire carcass to loosen the latter from the forming core so that after subsequent removal of the clamping rings the tire carcass can easily be removed therefrom. The air, water, or other fluid under pressure passed through the openings 15 causes a blister to form adjacent to said openings, and the blister quickly spreads around the entire circumference of the forming core and inwardly to the clamped base portion of the tire carcass.

By using a mixture of soap-stone and water for the pressure medium when loosening a freshly vulcanized carcass, a lubricating film will be deposited on the forming core, which acts to prevent the tire carcass from again sticking to the still hot forming core before the stripping operation can be accomplished.

Further, by the use of my invention a tire carcass can easily and quickly be loosened and removed from the forming core, so that the coating of rubber cement can be applied to the forming core while the latter is still warm enough to cause a quick drying of the rubber cement and thus time and trouble can be saved in again placing it in condition for use.

What I claim is:

1. The combination with a hollow tire forming core, said core being provided with a cluster of ducts in its outer periphery, of a clencher element of relatively smaller diameter than the forming core, said clencher element being constructed to engage the inner edges of a tire casing to clamp said edges against the core, and means for admitting fluid under pressure, through said cluster of ducts, against the inner surface of the tire casing, to break the adhesion between the tire and the core.

2. The combination with a hollow tire forming core, said core being provided with a cluster of ducts in its outer periphery, of a pair of clencher elements, of relatively smaller diameter than the core, said clencher elements being constructed to engage the bead elements of a tire casing, means for drawing said clencher elements toward each other, whereby a tire casing is clamped upon the core, and means for admitting fluid under pressure, through said cluster of ducts, against the inner surface of the tire casing, to break the adhesion between the tire and the core.

3. The combination with a hollow tire forming core, said core being provided with a cluster of ducts in its outer periphery, of clencher rings of relatively smaller diameter than the core, means upon the clencher rings constructed to engage the bead portions of a tire casing when said tire is mounted upon the core, means for drawing said clencher elements toward each other, whereby the lower edges of the casing are clamped against the core, and means for admitting fluid under pressure, through said cluster of ducts, against the inner surface of the tire casing, to break the adhesion between the tire and core.

4. The combination with a hollow tire forming core, said core being provided with a cluster of ducts in its outer periphery, of a pair of clencher rings of relatively smaller diameter than the core, a plurality of lugs upon each clencher ring constructed for engagment with the bead portions of a tire casing when said casing is mounted upon the core, means for drawing said clencher rings toward each other whereby the inner edges of the casing are clamped against the core, and means for admitting fluid under pressure through said cluster of ducts against the inner portion of the tire casing to break the adhesion between the casing and core.

5. The combination with a hollow tire forming core, said core being provided with a cluster of outlet ducts in its outer periphery, of a pair of clencher rings of relatively smaller diameter than the core, a plurality of lugs upon each clencher ring constructed to engage the bead portions of a tire casing when said casing is mounted upon the core, means upon the clencher rings for drawing them together, to clamp the lower edges of the casing against the core, and an inlet duct for communicating with the hollow core for admitting fluid under pressure through said cluster of outlet ducts against the inner surface of the tire casing whereby to loosen said casing from the core.

6. The combination with a tire forming core said core being provided with a plurality of ducts in its outer periphery, of a clencher element of relatively smaller diameter than the forming core, said clencher element being constructed to engage the inner edges of the tire casing, to clamp said edges against the core, and means for admitting fluid under pressure, through said plurality of ducts against the inner surface of the tire casing, to break the adhesion between the tire and core.

7. The method of loosening a tire casing from its forming core, which comprises, introducing a lubricating fluid under pressure through the forming core and between the core and the casing to break the adhesion therebetween while said core and casing are unconfined in a mold or the like.

8. The method of loosening a tire casing from its forming core, when said casing and core are unconfined in a mold or the like, which comprises clamping the inner edges of a tire on the forming core, and introducing fluid under pressure through the core between said mold and the casing to break the adhesion therebetween.

9. The method of loosening a tire casing from its forming core while said casing and core are unconfined in a mold or the like, which comprises clamping the inner edges of the casing upon the core, and introducing a lubricating liquid through the core between said core and the casing, to break the adhesion therebetween.

In witness whereof I have hereunto signed my name in the presence of two subscribing witnesses.

RALPH B. DAY.

Witnesses:
R. S. TROGNER,
A. H. LIDDERS.